United States Patent [19]

Singh

[11] Patent Number: 5,721,882

[45] Date of Patent: Feb. 24, 1998

[54] METHOD AND APPARATUS FOR INTERFACING MEMORY DEVICES OPERATING AT DIFFERENT SPEEDS TO A COMPUTER SYSTEM BUS

[75] Inventor: Ujjwal Singh, Auburn, Ala.

[73] Assignee: Intel Corporation, Santa Clara, Calif.

[21] Appl. No.: 807,212

[22] Filed: Feb. 28, 1997

Related U.S. Application Data

[63] Continuation of Ser. No. 286,427, Aug. 5, 1994, abandoned.

[51] Int. Cl.⁶ .................. G06F 13/36; G06F 13/42
[52] U.S. Cl. ............... 395/500; 395/281; 395/290; 395/306; 395/308; 395/309; 395/310; 364/240.3; 364/240.5
[58] Field of Search ................. 395/500, 200.05, 395/290, 306, 308, 309, 310, 281, 738; 364/240.3, 240.5, 926.91, DIG. 1

[56] References Cited

U.S. PATENT DOCUMENTS

| | | | |
|---|---|---|---|
| 4,831,520 | 5/1989 | Rubinfeld et al. | 395/306 |
| 4,864,496 | 9/1989 | Triolo et al. | 395/306 |
| 4,993,023 | 2/1991 | Phinney | 370/85.13 |
| 5,029,124 | 7/1991 | Leahy et al. | 395/285 |
| 5,097,437 | 3/1992 | Larson | 395/775 |
| 5,142,672 | 8/1992 | Johnson et al. | 395/500 |
| 5,228,134 | 7/1993 | MacWilliams et al. | 395/425 |
| 5,317,715 | 5/1994 | Johnson et al. | 395/425 |
| 5,341,495 | 8/1994 | Joyce et al. | 395/500 |
| 5,353,417 | 10/1994 | Fuoco et al. | 395/325 |
| 5,426,739 | 6/1995 | Lin et al. | 395/325 |
| 5,454,081 | 9/1995 | Thome | 395/281 |
| 5,469,577 | 11/1995 | Eng | 395/290 |
| 5,488,733 | 1/1996 | Molyneaux | 395/800 |
| 5,535,341 | 7/1996 | Shah et al. | 395/306 |
| 5,577,213 | 11/1996 | Avery et al. | 395/280 |

*Primary Examiner*—Kevin J. Teska
*Assistant Examiner*—Thai Phan
*Attorney, Agent, or Firm*—Blakely, Sokoloff, Taylor & Zafman

[57] ABSTRACT

An apparatus which includes a state machine which tests the condition of the PCI bus, the condition of a target device on the bus, and then generates signal to accomplish the transfer which signals vary with the ability of the target device to transfer the data at particular rates.

20 Claims, 4 Drawing Sheets

METHOD AND APPARATUS FOR INTERFACING MEMORY DEVICES OPERATING AT DIFFERENT SPEEDS TO A COMPUTER SYSTEM BUS

This is a continuation of application Ser. No. 08/286,427, filed Aug. 5, 1994, now abandoned.

BACKGROUND OF THE INVENTION

1. Field of the Invention

This invention relates to computer systems, and more particularly, to methods and apparatus for providing an interface by which data may be read at different transfer speeds from memory devices associated with a PCI bus.

2. History of the Prior Art

Historically, personal computers have utilized a single bus to transfer data between different internal components of the system. In personal computers using central processing units designed and manufactured by Intel Corporation of Santa Clara, Calif., such buses have typically been designed as either an Industry Standard Association (ISA) bus or an Expanded Industry Standard Association (EISA) bus. The ISA bus is a sixteen bit data bus while the EISA bus is thirty-two bits wide. Both the ISA bus and the EISA bus typically operate at a frequency just over eight megahertz. These bus widths and the rates at which each of these buses is capable of operating have limited the speed at which a computer can operate so there have been a number of attempts to increase bus speed.

One recently implemented method of increasing bus speed is to provide an additional, so called, "local bus" which is more closely associated with the central processor than either of the above-mentioned buses and which is capable of running at speeds closer to the speeds at which the processor itself runs. Those system components which require faster operation than has been available using the slower buses (such as an output display card driving an output display device) are joined to this faster local bus. The slower ISA or EISA bus is continued in essentially unchanged form as a secondary bus, and those components which are able to tolerate longer access times are associated with the slower bus.

Intel Corporation has designed a new local (or mezzanine) bus which may be associated in a computer system both with a processor and with other buses such as an ISA bus or an EISA bus (each of which is hereinafter referred to broadly as a secondary bus). This new local bus is able to transfer data more rapidly for selected components of the system without the conflicts and bottlenecks which arise using other local bus systems. This new bus is known as the peripheral component interconnect (PCI) bus. Initial designs of the PCI bus are thirty-two bits wide and are capable of operating at frequencies up to thirty-three megahertz.

One of the attributes of the PCI bus is its ability to transfer bursts of data. In burst transfers, a sequence of data addresses and data are transferred to the bus in a long burst without interruption. Such transfers are conducted synchronously under control of a clock provided by a PCI bus master. Using such a burst transfer mode is complicated by the fact that various devices such as memory from which data is accessed may be constructed to operate at different rates which are not necessarily the same as the rate of the bus master clock. For example, certain devices operate at speeds such that a transfer operation is accomplished without requiring any wait by the bus master. Other devices furnish data at a rate such that the bus must pause for one or more clock cycles while waiting for data. Since each bus master on the bus provides the clock signals by which the data is transferred, it is necessary for synchronous transfers that the bus be able to function with all of these different devices. It is possible to design bus slave devices to function with the precise timings necessary for synchronous transfers on the PCI bus, but it requires more costly design. It is desirable to allow bus slave devices to utilize synchronous burst transfers without requiring the costly design practiced in the prior art.

SUMMARY OF THE INVENTION

It is, therefore, an object of the present invention to provide apparatus and methods for allowing devices on the PCI bus to function in a synchronous mode on the bus even though those devices are capable of functioning at different rates of speed.

It is another object of the present invention to provide a method and apparatus for synchronizing data on the PCI bus.

These and other objects of the present invention are realized in an apparatus which includes a state machine in a target bus slave device from which data is to be read which tests the condition of the bus, the condition of the target device on the bus, provides a delay appropriate to the particular target device, and then generates a signal to accomplish the transfer, the timing of which signal varies with the ability of the target device to transfer the data at particular rates.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
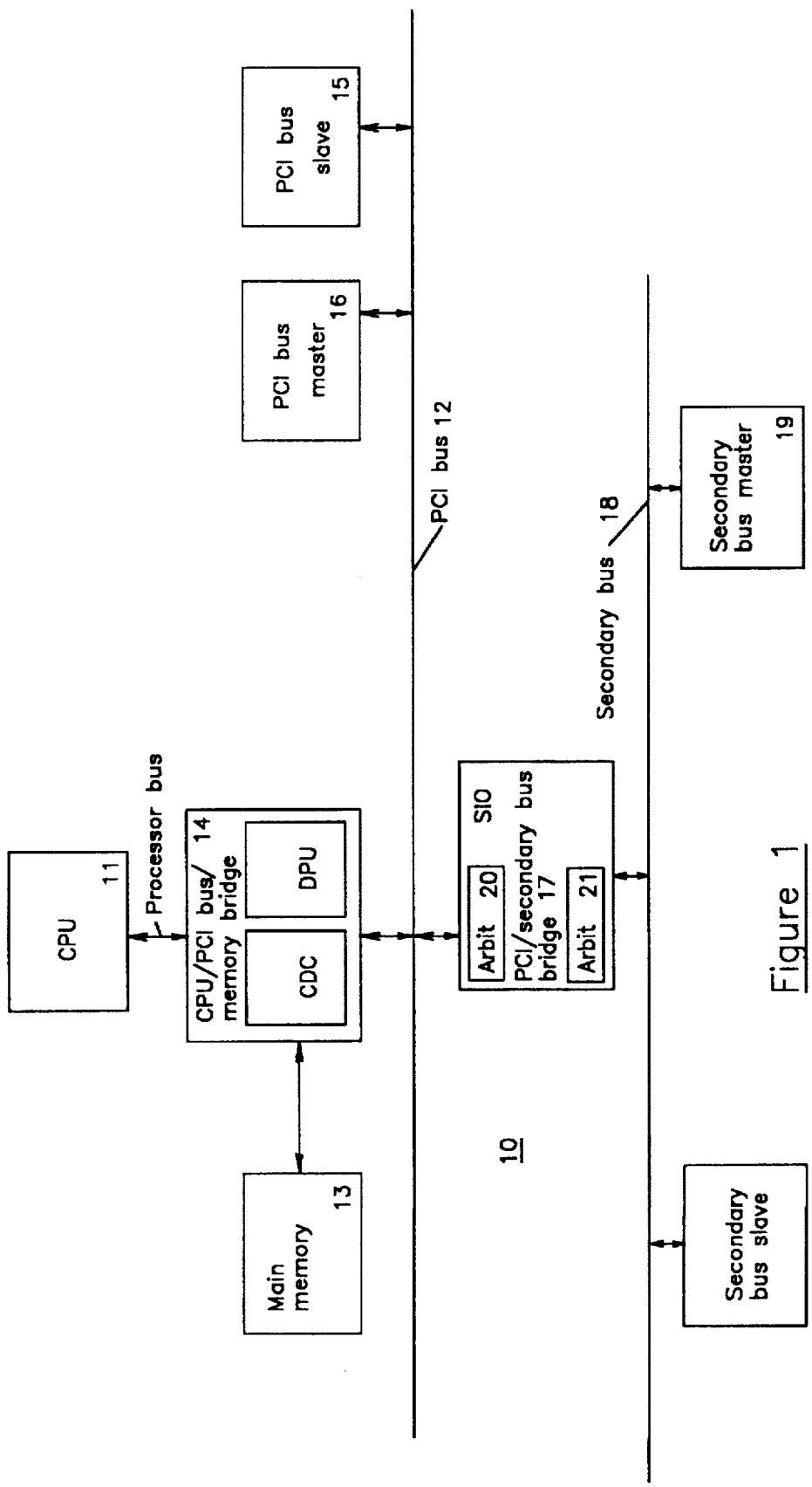
FIG. 1 is a block diagram of a computer system having a PCI bus which may utilize the present invention.

Referring now to FIG. 1, there is illustrated a computer system 10. The system 10 includes a central processor 11 such as an Intel i486™ microprocessor which carries out the various instructions provided to the computer 10 for its operations. The central processor 11 is coupled to a bus 12 adapted to carry information to various components of the system 10. The bus 12 is designed as a PCI bus in order to allow the transfer of data to and from the central processor 11 at a rate faster than is possible utilizing only the typical ISA or EISA buses used by the prior art. The processor 11 is connected to the bus 12 through a processor bus by a bridge circuit 14 which is adapted to provide various functions necessary to the transfer. Also connected to the PCI bus 12 by the bridge circuit 14 is main memory 13 which is typically constructed of dynamic random access memory (DRAM) arranged in a manner well known to those skilled in the prior art to store information during a period in which power is provided to the system 10. In the embodiment illustrated, the bridge circuit 14 is physically constructed to include both a cache and DRAM controller (CDC) chip and a data path unit (DPU) chip each of which is manufactured by Intel Corporation of Santa Clara, Calif. Detailed descriptions of these chips are provided in *Cache & DRAM Controller (CDC) 82424TX* and *Data Path Unit (DPU) 82423TX*, each published by Intel Corporation. In addition to various functions such as cache control and data synchronization, the bridge circuit 14 includes circuitry for controlling and accomplishing the transfer of data among the CPU 11, main memory 13, and the PCI bus 12.

The PCI bus 12 provides access to components associated therewith such as a PCI bus slave circuit 15 and a PCI bus master circuit 16. A PCI bus slave circuit is adapted to receive and provide data on the PCI bus under control of other circuitry associated with the bus. One example of a PCI bus slave circuit is a video output card including a frame buffer adapted to store video signals to be transferred to an output device such as a monitor for display. Another example of a PCI bus slave circuit is a flash memory array which may provide non-volatile storage to supplement the storage provided by main memory 13. The main properties of a PCI bus master are that it includes a bus controller which functions at some internal clock rate and that it may initiate and control operations on the PCI bus 12.

Also connected to the PCI bus 12 is a PCI/secondary bus bridge circuit 17. The bridge circuit 17 performs the various functions necessary to transfer data between the PCI bus 12 and various component circuits joined to a secondary bus 18. The secondary bus 18 may be an ISA bus, an EISA bus, or some bus which typically operates at a slower data transfer rate than the PCI bus 12. A specific PCI to ISA bus bridge circuit 17 is a part of an integrated circuit chip referred to as a "system input/output" (SIO) circuit manufactured by Intel Corporation. Such a bridge is described in detail in a publication entitled 82420/82430 *PCIset ISA and EISA Bridges*, published by Intel Corporation. Such a bridge circuit 17 includes circuitry for providing the interface between the PCI bus 12 and the secondary bus 18 which allows data to be transferred between the two buses. The bridge circuit 17 provides circuitry which allows it to operate as an intercoupling bus master or as a bus slave on the PCI bus 12. The ability of the bridge circuit 17 to act as a PCI bus master allows a bus master circuit 19 positioned on the secondary bus 18 (for example, local area network circuitry) to gain access to the PCI bus 12 and from there to the main memory. In one embodiment, the SIO chip which includes the bridge circuit 17 also includes a first arbiter circuit 20 for controlling access to the PCI bus 12 and a second arbiter circuit 21 for controlling access to the secondary bus 18.

The PCI bus 12 is adapted to allow the connection of a number of bus masters each of which may control operations on the PCI bus. For example, each of the bridge circuits 14 and 17 as well as the PCI bus master circuit 16 are PCI bus masters which include a bus controller which functions at some internal clock rate and may initiate and control operations on the PCI bus 12.

Figure 2:
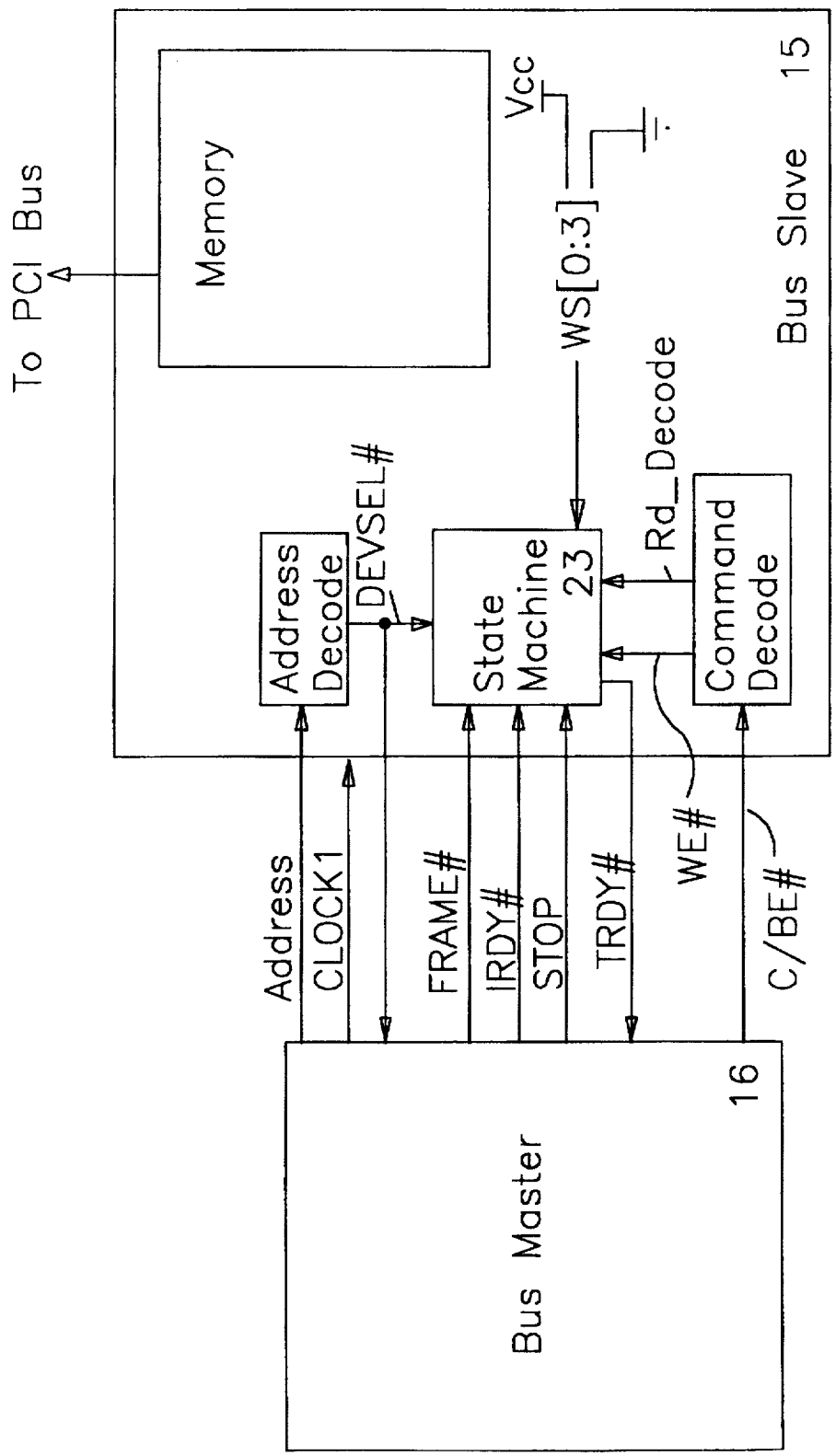
FIG. 2 is a block diagram of a PCI bus master and a PCI bus slave such as are illustrated in FIG. 1.

FIG. 2 is a block diagram illustrating portions of both a PCI bus master 16 and a PCI bus slave circuit 15 which pertain to the present invention. As may be seen in FIG. 2, the bus master 16 initiates a number of signals which are utilized for the transfer of data. (In this specification, a signal which includes a "#" in its name is considered to be an active low signal. The term "assert" as applied to a signal indicates that signal is active independent of whether the level of the signal is low or high. The term "de-assert" indicates that a signal is inactive.) Each PCI bus master asserts a signal FRAME# to indicate the beginning of a burst transfer operation. Each bus master also provides a clock signal CLOCK1 which is utilized to accomplish the synchronous transfer of data on the bus 12. The bus master circuits generate a specific byte sequence on a command and byte enable (C/BE#) bus, a four bit control bus associated with the bus 12, to indicate that an operation is to be a read of data from the addressed location. During a read operation, each bus master furnishes an address from which data is to be read onto the bus under control of the bus master. The bus master circuits also asserts an initiator ready (IRDY#) signal to indicate that the particular bus master is ready to accomplish a data transfer on the bus and furnishes certain other signals (such as signals on the C/BE# bus which decode as write enable signals WE# during write operations) which are utilized during the transfer of data for controlling the operation and assuring that the timing of the control signals are correct for the various operations. All of these signals are utilized in burst transfers of data on the PCI bus 12.

A bus master 16 asserts the FRAME# signal to indicate that a transfer operation is to occur on the bus. As long as the bus master is asserting FRAME#, data may be transferred from addresses which are sequentially incremented from the initial address indicated by the bus master during such a burst transfer. When a burst transfer operation is about to cease, the signal FRAME# is de-asserted; and the final cycle of operation is completed so long as the bus master continues to be ready as indicated by the continued assertion of the signal IRDY#.

A target device such as a bus slave circuit 15 receives the FRAME# signal and the read address and determines using address decode circuitry that it is the device addressed by the bus master 16. In response to this determination, the target device asserts the DEVSEL# signal indicating that it is the correct device. The target device also receives the read command signal on the C/BE# bus and using command decode circuitry generates an internal signal RD_Decode indicating that the operation is a read operation. The target device asserts a signal TRDY# when it is ready to transfer data signifying that the target device is ready to transfer data. If the FRAME# signal and IRDY# are asserted by the bus master and the TRDY# signal is asserted by the bus slave, the transfer occurs. During the transfer, a state machine 23 which is a part of each bus slave circuit controls the TDRY# signal (which controls the transfer) so that bus slaves having different operating speeds may all function synchronously with the single clock signal CLOCK1 provided by the bus master. The state machine circuitry itself includes provision for determining the operating speed of the target device and varying the time at which the TRDY# signal is provided depending on the operating speed determined. This allows the designer of the slave device to design without regard to meeting exact timing requirements on the PCI bus 12.

Figures 3A, 3B:
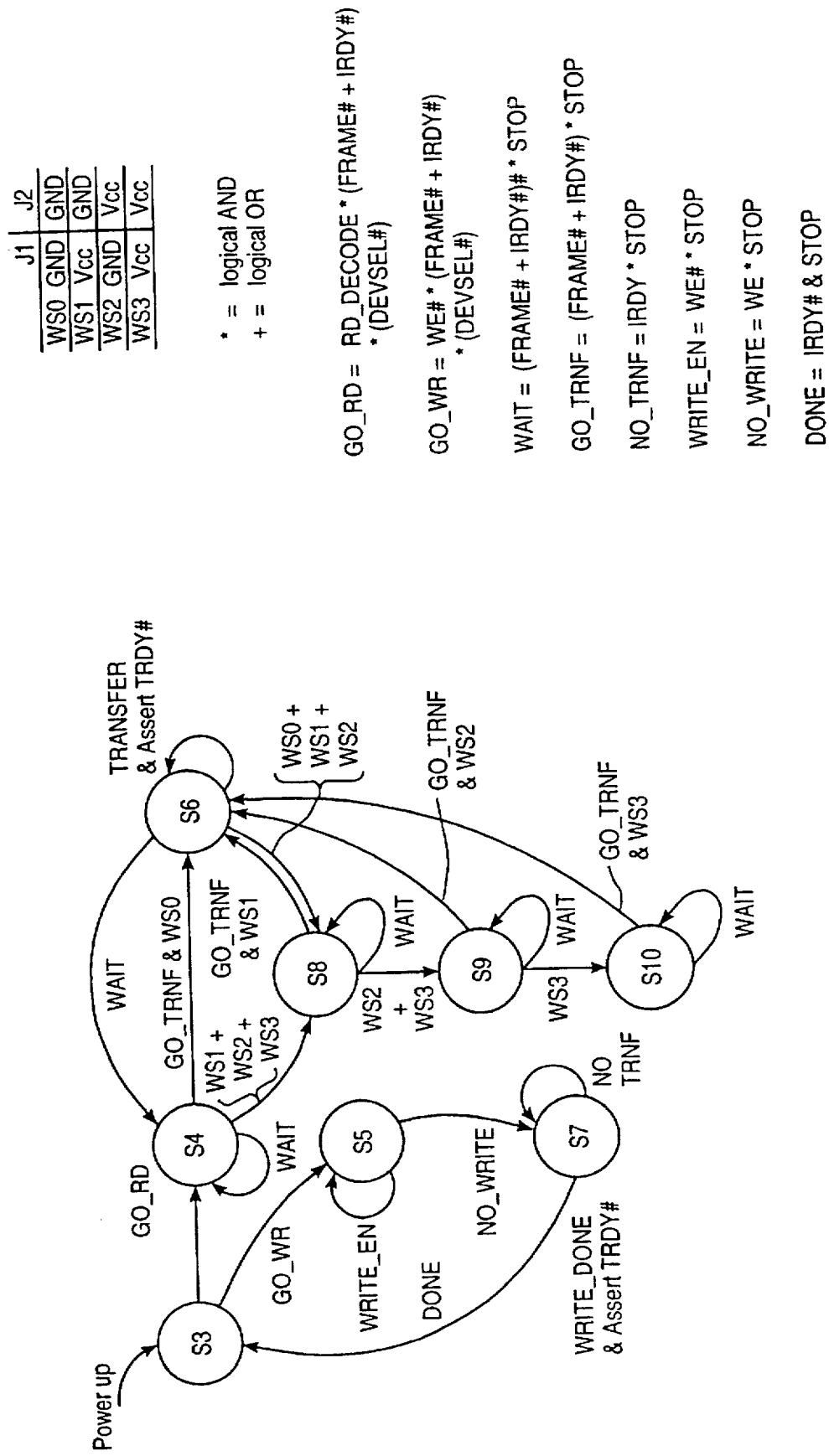
FIG. 3A is a state diagram illustrating the operation of a state machine included in the bus slave of FIG. 2.
FIG. 3B shows various states provided by jumpers in conjunction with the operation of one embodiment of the present invention.
Figure 4:
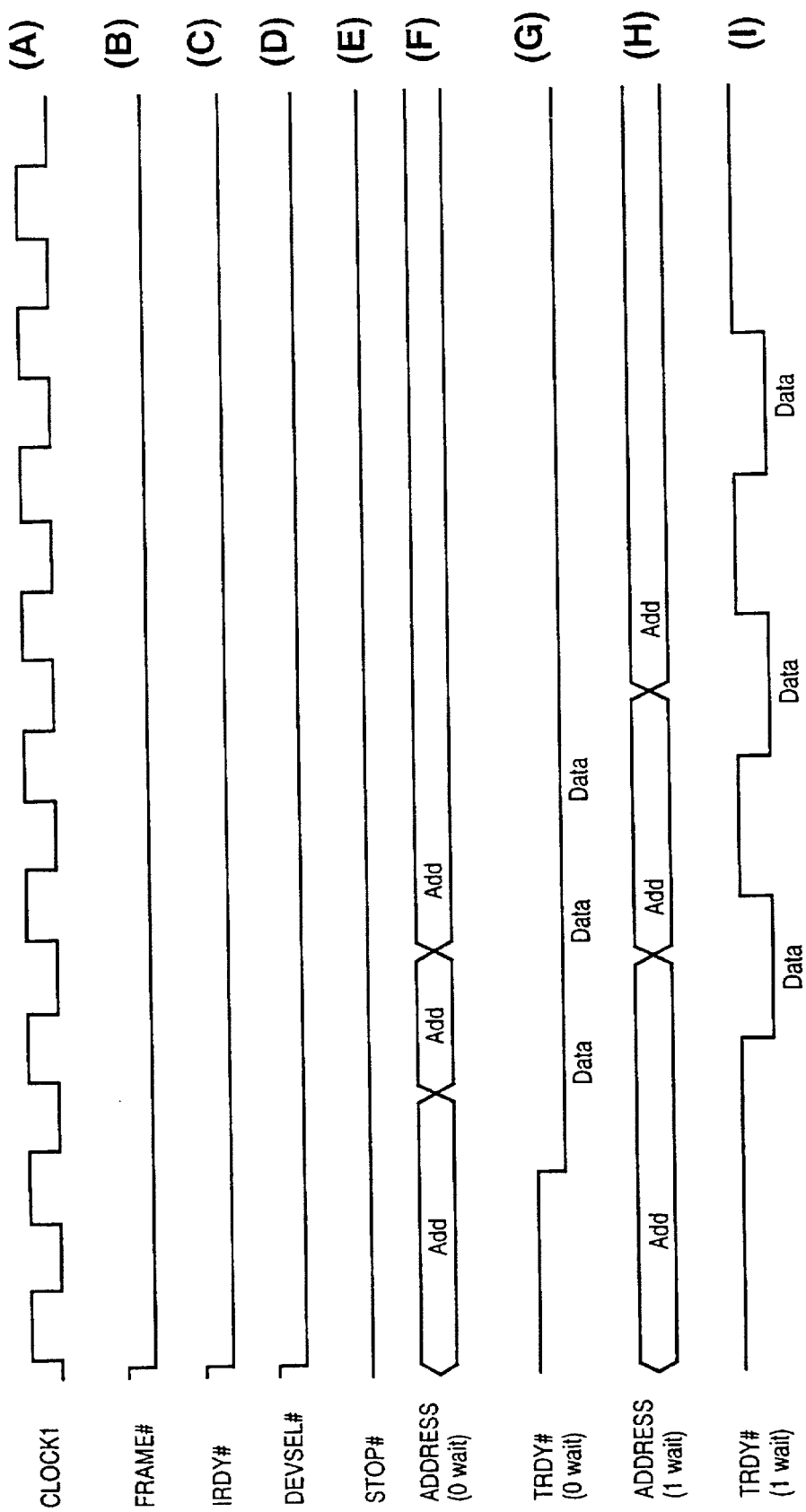
FIG. 4 is a timing diagram useful is describing the operation of the invention.

FIG. 3A is a state diagram indicating the operation of the state machine 23. The operation of the state machine 23 relating to data transfers on the bus 12 commences upon the application of power in a default state S3. In this state S3, the state machine responds to signals indicating a read cycle, a correct device address, and an asserted FRAME# or IRDY# signal by commencing a read operation illustrated in the figure as GO_RD and moving to state S4. The signal FRAME# is deasserted and the signal IRDY# is asserted to indicate that only one transfer remains. Both the signal FRAME# and the signal IRDY# are deasserted to indicate that the transaction is complete. These signals and the other signals utilized in the present invention are illustrated in FIG. 3B for bus slave devices having transfer speeds providing zero, one, two, and three wait state performance. These signals are also illustrated in the example timing diagram of FIG 4. In state S4, the output of the addressed device caused by the state machine 23 is a deasserted TRDY# signal which indicates that the device is not ready for a read operation. Typically, the operation of the state machine 23 immediately moves from state S4 to a next state unless at any time a STOP# signal indicating some delay in the availability of data (caused by parity errors or the like) is received before moving. If in state S4, the state machine 4 receives no STOP# signal and no jumper signal WS[0:3], the operation moves to state 86. This is indicated by the path GO_TRNF in the figure.

In one embodiment of the invention, two individual jumpers are provided the settings of which furnish output signals WS[0:3]. If a jumper produced signal is present, the state machine 23 moves to one of states S8, S9, or S10. The particular state is determined by the particular jumper signal provided, a signal set on the circuit board by the manufacturer or user depending on the speed characteristics of the particular device. For example, a manufacturer provided memory having a 70 nanosecond characteristic would set (or suggest setting) no jumpers. A manufacturer of slower 100 nanosecond memory might set jumpers to produce a signal WS0 causing the state machine to move to the state 8. A manufacturer of even slower 120 nanosecond memory might set jumpers to produce a signal WS1 causing the state machine to move to the state 9. Although four wait states are provided the jumpers and three wait states are used as shown in FIG. 3B, it is clear that additional wait states might easily be provided by increasing the number of jumpers.

In any of the states S8–S10, the state machine provides the appropriate delay to match the characteristics of the device indicated by the wait state signal before moving to the state S6 at which signal TRDY# is initiated so that the transfer operation is executed. At this state S6, the transfer of data begins and continues until the PCI bus master deasserts the FRAME# signal indicating that the burst read operation is complete. It is possible for the transfer operation to be interrupted by a wait condition, in which case the operation returns to state S4 until the delay in removed. As mentioned, the last cycle of the transfer operation is completed after the de-assertion of the FRAME# signal so long as the bus master continues to assert the IRDY# signal.

It should be specifically noted that the target (the slave device) controls the wait state performance. The slave device does this by its delay timing prior to asserting the signal TRDY#. The delay timing is controlled by the jumper setting and the signal WS[0:3] generated thereby. The ability to provide a simple jumper setting to allow read transfers to occur at different rates even though the transfer is synchronous eliminates the need to worry about target timing during design.

The state machine 23 of the present invention may be implemented quite easily by three registers or other means which are capable of providing eight individual output states.

FIG. 3 also describes a write operation for the embodiment of the invention illustrated. If in state S3 a write enable signal WE# is received from the bus master during the presence of an FRAME# signal where the slave device is being addressed, the device moves to a state S5. In the state S5, the operation waits for the slave device to assert the signal TRDY#. When the signal is asserted, the operation moves to state S7, continues to assert the signal TRDY#, and accomplishes the write transfer.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer system comprising:
   a main memory;
   a central processing unit (CPU);
   a first bus coupled to the CPU and to the main memory;
   a mezzanine bus;
   a first bridge circuit that separates the first bus from the mezzanine bus and provides information transfer therebetween;
   a bus master coupled to the mezzanine bus that controls a burst operation comprising a transfer of data on the mezzanine bus, the bus master providing signals that initiate and complete the burst operation;
   a bus slave coupled to the mezzanine bus that responds to the signals by asserting a ready signal which commences the transfer of data on the mezzanine bus, the bus slave including a state machine that varies a timing of the ready signal such that the transfer of data occurs synchronously on the mezzanine bus at a rate matched to the bus slave.

2. The computer system of claim 1 further comprising:
   a secondary bridge circuit;
   a secondary bus coupled to the mezzanine bus via the secondary bridge circuit, the mezzanine bus having a first rate of operation and the secondary bus having a second rate of operation which is substantially slower than the first rate of operation.

3. The computer system of claim 1 wherein the timing of the ready signal comprises a delay timing.

4. The computer system of claim 3 wherein the delay timing is controlled by a jumper setting of the bus slave.

5. The computer system of claim 1 wherein the state machine comprises a plurality of registers providing at least eight output states.

6. The computer system of claim 1 wherein the signals provided by the bus master include a first signal and a second signals, both of which must be asserted for the transfer of data to occur.

7. The computer system of claim 6 wherein deassertion of the second signal, while the first signal is asserted, provides an indication to the bus slave that only one transfer remains to complete the burst operation.

8. The computer system of claim 1 wherein said burst operation comprises the transfer of said data on the mezzanine bus from a sequential addresses beginning from an initial address.

9. A method of synchronously transferring data in a burst operation on a mezzanine bus of a computer system which also includes a central processing unit (CPU), a CPU bus, and a secondary bus, the mezzanine bus being separated from the CPU bus by a first bridge circuit and from the secondary bus by a second bridge circuit, the method comprising the steps of:

(a) providing a first signal and a second signal on the mezzanine bus by a bus master to initiate the burst operation;

(b) asserting by a bus slave a ready signal on the mezzanine bus to commence the transfer of data responsive to the first and second signals, the ready signal having an associated timing; and (c) controlling the associated timing of the ready signal by a state machine of the bus slave such that the transfer of data occurs synchronously on the mezzanine bus at a rate matched to the bus slave.

10. The method according to claim 9 further comprising the step of:

transitioning at least one the first signal or the second signal provided by the bus master to indicate to the bus slave that only one transfer remains to complete the burst operation.

11. The method of claim 9 wherein the associated timing of the ready signal comprises a delay timing.

12. The method of claim 11 wherein the delay timing is controlled by a jumper setting of the bus slave.

13. The method of claim 9 further comprising the step of:

asserting the first signal and the second signal in order for the transfer of data to occur.

14. The method of claim 9 further comprising the step of deasserting the second signal while the first signal is asserted, wherein said deassertion of the second signal, while the first signal is asserted, provides an indication to the bus slave that only one transfer remains to complete the burst operation.

15. The method of claim 9 wherein said burst operation comprises the transfer of said data on the mezzanine bus from a sequential addresses beginning from an initial address.

16. A method of synchronously transferring data in a burst operation on a mezzanine bus of a computer system which also includes a central processing unit (CPU), a CPU bus, and a secondary bus, the mezzanine bus being separated from the CPU bus by a first bridge circuit and from the secondary bus by a second bridge circuit, the method comprising the steps of:

providing an initiating signal on the mezzanine bus by a bus master to initiate the burst operation;

asserting by a bus slave a ready signal on the mezzanine bus to commence the transfer of data responsive to the initiating signal, the ready signal having an associated timing; and controlling the associated timing of the ready signal by a state machine of the bus slave such that the transfer of data occurs synchronously on the mezzanine bus at a rate matched to the bus slave.

17. The method of claim 16 wherein the burst operation comprises a transfer of data from sequential addresses beginning from an initial address.

18. The method of claim 16, wherein said initiating signal comprises a first signal and a second signal.

19. The method of claim 18, wherein both said first signal and said second signal are asserted for a data transfer to occur.

20. The method of claim 18 wherein when only one of said first signal and said second signal is asserted indicates to the bus slave that only one transfer remains to complete the burst operation.

* * * * *